Patented May 9, 1944

2,348,463

UNITED STATES PATENT OFFICE 2,348,463

PRODUCTION OF COLOR PHOTOGRAPHIC IMAGES

Alfred Fröhlich and Wilhelm Schneider, Dessau, and Walter Zeh, Wolfen, Germany, assignors to General Aniline & Film Corporation, New York, N. Y., a corporation of Delaware No Drawing. Application February 17, 1942, Serial No. 431,273. In Germany October 19, 1940

9 Claims. (Cl. 95—6)

Our present invention relates to the production of color photographic images and more particularly of red images obtained by color forming development.

For the production of color photographic images by color forming development pyrazolones have already been proposed as dyestuff formers for the red image. For the purposes of multicolor photography it is advantageous to use dyestuff formers for red which are especially permeable to blue rays and show a high transparency.

It has been found that this requirement is fulfilled by using 1-phenylpyrazolones which carry alkyl, alkoxy- or aroxy groups in the phenyl radical in the o-position to the linkage of the phenyl ring to the pyrazolone ring. The introduction of the substituents into this o-position results in a shifting of the absorption maxima towards the long-wave region of the dyestuffs formed with dialkylaminoaniline by color forming development. The displacement is dependent in size on the nature of the substituents. Contrary to expectation this displacement is greater than that produced by an analogous substitution in the m- or p-positions of the phenyl ring of the pyrazolone. Therefore the dyestuffs produced with the dyestuff formers of the present invention exhibit a relatively high permeability to blue light. In addition to one of the substituents mentioned above the phenyl radical may contain acid groups rendering the dyestuff former water-soluble and/on radicals producing fastness to diffusion as disclosed in U. S. Patents 2,186,852, 2,186,851, 2,186,-849, 2,186,734, 2,186,733, 2,186,732 dated January 9, 1940, U. S. Patents 2,179,244, 2,186,719, 2,178,-612 dated November 7, 1939, and U. S. Patents 2,280,722, 2,292,575, 2,307,399 and 2,303,928. Italian Patents 344,649, 344,648, French Patent 844,-637 and U. S. Patent applications Ser. Nos. 284,-258, filed July 13, 1939, 333,814, filed May 7, 1940, 335,144 filed May 14, 1940, 341,180 filed June 18, 1940, and 362,592 filed October 24, 1940.

As to pyrazolones containing a diffusion-preventing group in the form of a higher alkyl ester directly linked to the pyrazolone ring the substituent introduced into the 3-position still increases the fastness to diffusion of the dyestuff former, moreover influences the velocity of the coupling with the oxidation products of the color developer and yields dyestuff images having a very high transparency. The absorption maxima of the dyestuffs produced with the dyestuff formers extend from about 530 to 560 mu. They include color tones from a slightly bluish red to a very strong blue-red which are especially characterized by an excellent transparency. The dyestuff components of the invention may be used with advantage for the production of multi-color images since it is of special importance in color photography that dyestuff formers are available which render it possible to adjust the emulsion layers so as to obtain harmonious images with colors of a high clearness.

The silver halide emulsions prepared by means of the non-diffusing dyestuff formers may be cast to form single layers or worked up into multi-layer materials containing the several emulsion layers on one or both sides of the support and, if necessary, filter layers, intermediate layers, or anti-halation layers. The dyestuff images may be produced by simple or reversal development as negatives or positives respectively.

The following examples illustrate the present invention but they are not intended to limit it thereto.

Example 1

10 g. of 1-(2'-methylphenyl-5'-sulfonic acid)-3-heptadecyl-5-pyrazolone are dissolved in 300 cc. of n/10 sodium hydroxide solution and added to a silver halide gelatin emulsion. On color forming development with p-dimethylaminoaniline the exposed emulsion layer yields a bluish-red dyestuff image having a high transparency and an absorption maximum of 535 mu.

Example 2

10 g. of 1-(2'-methoxyphenyl-4'-sulfonic acid)-3-heptadecyl-5-pyrazolone are neutralized with n/10 sodium hydroxide solution made up with water to 200 cc. and clearly dissolved with gentle heating. Before casting the solution is added to 1 kilo of a silver halide gelatin emulsion. On treatment with a color developer containing p-dimethylaminoaniline the exposed layer yields a very clear bluish-red dyestuff image. The absorption maximum of the formed dyestuff is at about 540 mu.

Example 3

10 g. of 1-(2'-methoxyphenyl-5'-sulfonic acid)-3-(3'-stearylaminophenyl)-5-pyrazolone is neutralized with n/10 sodium hydroxide solution and made up with water to about 250 cc. and dissolved with gentle warming. The solution is added to one kilo of a silver halide gelatin emulsion and cast to form a layer. The exposed layer is developed with a developer containing p-dimethylaminoaniline and yields an intensely blue-red dyestuff image the dyestuff of which shows an absorption maximum at about 555 mu.

*Example 4*

10 g. of 1-(2'-phenoxyphenyl-3'-sulfonic acid) sodium-3-heptadecyl-5-pyrazolone are dissolved in about 200 cc. of water with heating and added to 1 kilo of a silver halide gelatin emulsion before casting. On treatment with a developer containing p-dimethylaminoaniline a very clear bluish-red dyestuff image is obtained.

Instead of the sodium salt other soluble salts of the dyestuff former may be used, for instance other alkali metal salts.

We claim:

1. In a process of producing color photographic images by color forming development, an improvement which comprises developing the exposed photographic silver halide emulsion with an aromatic primary amino developer containing as the dyestuff former for the red image a soluble salt of a 1-phenylpyrazolone carrying in the phenyl radical in the o-position to the linkage of the phenyl ring to the pyrazolone ring a substituent selected from the class consisting of alkyl, alkoxy and aroxy groups.

2. In a process of producing color photographic images by color forming development, an improvement which comprises exposing the photographic silver halide gelatin emulsion containing as the dyestuff former for the red image a soluble salt of a 1-phenylpyrazolone carrying on the carbon atom in the 3-position of the pyrazolone ring at least one radical imparting thereto fastness to diffusion with respect to said binding agent of the emulsion and in the phenyl radical in the o-position to the linkage of the phenyl ring to the pyrazolone ring a substituent selected from the class consisting of alkyl, alkoxy and aroxy groups and developing said emulsion with an aromatic primary amino developer.

3. A silver halide gelatin emulsion for color forming development containing a soluble salt of a 1-phenylpyrazolone carrying on the carbon atom in the 3-position of the pyrazolone ring at least one radical imparting thereto fastness to diffusion with respect to said binding agent of the emulsion and in the phenyl radical in the o-position to the linkage of the phenyl ring to the pyrazolone ring a substituent selected from the class consisting of alkyl, alkoxy and aroxy groups.

4. A color forming developer comprising an aqueous solution containing an aromatic primary amino developing agent and a soluble salt of a 1-phenylpyrazolone carrying in the phenyl ring in the o-position to the linkage of the phenyl ring to the pyrazolone ring a substituent selected from the class consisting of alkyl, alkoxy and aroxy groups.

5. In a process of producing color photographic images by color forming development, the improvement which comprises developing an exposed silver halide emulsion with an aromatic primary amino developer in the presence of a soluble salt of a 1-phenyl pyrazolone carrying in the phenyl radical in the o-position to the linkage of the phenyl ring to the pyrazolone ring, a substituent selected from the class consisting of alkyl, alkoxy and aroxy groups.

6. The composition as defined in claim 4 wherein the radical imparting fastness to diffusion with respect to the binding agent of the emulsion is a long alkyl chain which is linked to said carbon atom in 3-position by a linkage selected from the class consisting of a direct nuclear carbon to carbon linkage, an amide linkage and an ester linkage.

7. A silver halide gelatin emulsion for color-forming development containing the sodium salt of 1-(2'-methylphenyl-5'-sulfonic acid)-3-heptadecyl-5-pyrazolone.

8. A silver halide gelatin emulsion for color-forming development containing the sodium salt of 1-(2'-methoxyphenyl-4'-sulfonic acid)-3-heptadecyl-5-pyrazolone.

9. A silver halide gelatin emulsion for color-forming development containing the sodium salt of 1-(2'-phenoxyphenyl-3'-sulfonic acid)-3-heptadecyl-5-pyrazolone.

ALFRED FRÖHLICH.
WILHELM SCHNEIDER.
WALTER ZEH.